United States Patent
Wong (10) Patent No.: US 12,229,130 B2
(45) Date of Patent: Feb. 18, 2025

(54) MANAGING QUERIES FOR BLENDED DATA FROM DATA MODELS

(71) Applicant: Business Objects Software Ltd., Dublin (IE)

(72) Inventor: Justin Wong, Burnaby (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 0 days.

(21) Appl. No.: 17/696,726

(22) Filed: Mar. 16, 2022

(65) Prior Publication Data

US 2023/0297571 A1    Sep. 21, 2023

(51) Int. Cl.
*G06F 16/2453*  (2019.01)
*G06F 16/242*   (2019.01)
*G06F 16/26*    (2019.01)

(52) U.S. Cl.
CPC .... *G06F 16/24539* (2019.01); *G06F 16/2425* (2019.01); *G06F 16/26* (2019.01)

(58) Field of Classification Search
CPC . G06F 16/24539; G06F 16/2425; G06F 16/26
See application file for complete search history.

(56) References Cited

U.S. PATENT DOCUMENTS

| 5,751,286 A * | 5/1998 | Barber | G06V 10/507 |
| | | | 707/E17.025 |
| 2010/0153874 A1* | 6/2010 | McKinney | G06F 16/283 |
| | | | 715/781 |
| 2012/0072410 A1* | 3/2012 | Wang | G06F 16/532 |
| | | | 707/711 |
| 2012/0259895 A1* | 10/2012 | Neely, III | G06F 16/367 |
| | | | 707/E17.011 |
| 2012/0323947 A1* | 12/2012 | Bice | G06F 16/2425 |
| | | | 707/769 |

(Continued)

FOREIGN PATENT DOCUMENTS

EP    3567497 A1    11/2019

OTHER PUBLICATIONS

"Introduction to SAP Analytics Cloud (SAC)", Jul. 31, 2020, pp. 42-64, 74 pages.

(Continued)

*Primary Examiner* — Cam Y T Truong
(74) *Attorney, Agent, or Firm* — Fountainhead Law Group, PC (57) ABSTRACT

Some embodiments provide a program that receives a first selection of a first set of attributes in a first data model, a second selection of a second set of attribute in a second data model, a third selection of a first dimension in the first data model, and a fourth selection of a second dimension in second data model. The program further receives a request for data for a visualization. The program also generates a blend definition based on the first set of attributes, the second set of attributes, the first dimension in the first data model, and the second dimension in the second data model. The program further generates a blended query model based on the blend definition. The program also executes a query based on the blended query model to generate a result set of data. The program provides a visualization that includes the result set of data.

18 Claims, 8 Drawing Sheets

(56) References Cited

U.S. PATENT DOCUMENTS

| | | | | |
|---|---|---|---|---|
| 2013/0124500 A1* | 5/2013 | Beavin | ............. | G06F 16/24534 |
| | | | | 707/E17.017 |
| 2017/0193024 A1* | 7/2017 | Fung | ..................... | G06F 16/248 |
| 2017/0193036 A1* | 7/2017 | Yueh | ..................... | G06F 16/242 |
| 2021/0279259 A1* | 9/2021 | Rastogi | ................... | G06F 16/27 |
| 2022/0197899 A1* | 6/2022 | Kanani | ................. | G06N 20/00 |

OTHER PUBLICATIONS

B N K, Sowjanya, "Blending Datasets in SAP Analytics Cloud—Visual BI Solutions", Apr. 9, 2019, pp. 2-5, 9 pages.
Extended European Search Report for EP Application No. 22183260.3-1203, dated Jan. 4, 2023, 164 pages.

* cited by examiner

MANAGING QUERIES FOR BLENDED DATA FROM DATA MODELS

BACKGROUND

Many software applications utilize data stored in databases. In order to obtain such data, a software application typically generates a query for the desired data and sends the query to the database for processing. In return, the software application receives the requested data. The query can request data from a single table in a database or multiple tables in the database. One type of query for data from multiple tables is a join. In such a query, records from several tables with matching values in specified columns of the tables are identified and combined. The combined records are returned as the results of the query.

SUMMARY

In some embodiments, a non-transitory machine-readable medium stores a program executable by at least one processing unit of a device. The program receives a first selection of a first set of attributes in a first data model, a second selection of a second set of attribute in a second data model, a third selection of a first dimension in the first data model, and a fourth selection of a second dimension in second data model. The program further receives a request for data for a visualization. In response to the request, the program also generates a blend definition based on the first set of attributes, the second set of attributes, the first dimension in the first data model, and the second dimension in the second data model. The program further generates a blended query model based on the blend definition. The program also executes a query based on the blended query model to generate a result set of data. The program further provides a visualization that includes the result set of data.

In some embodiments, the program may further, after executing the query, delete the blend definition and the blended query model. The result set of data may be a first result set of data, the request for data for the visualization may be a first request for data for a first visualization, and the query may be a first query. The program further, after executing the first query, store the generated blended query model for later use, receive a second request for data for a second visualization, in response to the second request, execute a second query based on the blended query model to generate a second result set of data, and provide the second visualization that includes the second result set of data.

In some embodiments, generating the blended query model may include sending a computing system a request for metadata describing a blended data model comprising data blended based on the blend definition; receiving the metadata from the computing system; and converting the metadata into the blended query model. The first set of attributes in the first data model may be included in the first plurality of attributes in the first data model. The second set of attributes in the second data model may be included in the second plurality of attribute in the second data model.

In some embodiments, executing the query may include generating the query based on the blended query model, sending the query to a computing system, receiving the result set of data from the computing system, and generating the visualization that includes the result set of data. The program may further receive a data blend configuration, wherein generating the blend definition is further based on the data blend configuration.

In some embodiments, a method receives a first selection of a first set of attributes in a first data model, a second selection of a second set of attribute in a second data model, a third selection of a first dimension in the first data model, and a fourth selection of a second dimension in second data model. The method further receives a request for data for a visualization. In response to the request, the method also generates a blend definition based on the first set of attributes, the second set of attributes, the first dimension in the first data model, and the second dimension in the second data model. The method further generates a blended query model based on the blend definition. The method also executes a query based on the blended query model to generate a result set of data. The method further provides a visualization that includes the result set of data.

In some embodiments, the method may further, after executing the query, delete the blend definition and the blended query model. The result set of data may be a first result set of data, the request for data for the visualization may be a first request for data for a first visualization, and the query may be a first query. The method may further, after executing the first query, store the generated blended query model for later use; receive a second request for data for a second visualization; in response to the second request, execute a second query based on the blended query model to generate a second result set of data, and provide the second visualization that includes the second result set of data.

In some embodiments, generating the blended query model may include sending a computing system a request for metadata describing a blended data model comprising data blended based on the blend definition, receiving the metadata from the computing system, and converting the metadata into the blended query model. The first set of attributes in the first data model may be included in the first plurality of attributes in the first data model. The second set of attributes in the second data model may be included in the second plurality of attribute in the second data model.

In some embodiments, executing the query may include generating the query based on the blended query model, sending the query to a computing system, receiving the result set of data from the computing system, and generating the visualization that includes the result set of data. The method may further receive a data blend configuration, wherein generating the blend definition is further based on the data blend configuration.

In some embodiments, a system includes a set of processing units and a non-transitory machine-readable medium that stores instructions. The instructions cause at least one processing unit to receive a first selection of a first set of attributes in a first data model, a second selection of a second set of attribute in a second data model, a third selection of a first dimension in the first data model, and a fourth selection of a second dimension in second data model. The instructions further cause the at least one processing unit to receive a request for data for a visualization. In response to the request, the instructions also cause the at least one processing unit to generate a blend definition based on the first set of attributes, the second set of attributes, the first dimension in the first data model, and the second dimension in the second data model. The instructions further cause the at least one processing unit to generate a blended query model based on the blend definition. The instructions also cause the at least one processing unit to execute a query based on the blended query model to generate a result set of data. The instructions further cause the at least one processing unit to provide a visualization that includes the result set of data.

In some embodiments, the instructions may further cause the at least one processing unit to, after executing the query, delete the blend definition and the blended query model. The result set of data may be a first result set of data, the request for data for the visualization may be a first request for data for a first visualization, and the query may be a first query. The instructions may further cause the at least one processing unit to after executing the first query, store the generated blended query model for later use; receive a second request for data for a second visualization; in response to the second request, execute a second query based on the blended query model to generate a second result set of data; and provide the second visualization that includes the second result set of data.

In some embodiments, generating the blended query model may include sending a computing system a request for metadata describing a blended data model comprising data blended based on the blend definition, receiving the metadata from the computing system, and converting the metadata into the blended query model. The first set of attributes in the first data model may be included in the first plurality of attributes in the first data model. The second set of attributes in the second data model may be included in the second plurality of attribute in the second data model.

In some embodiments, executing the query may include generating the query based on the blended query model, sending the query to a computing system, receiving the result set of data from the computing system, and generating the visualization that includes the result set of data.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for managing queries for blended data from data models. In some embodiments, a client device provides visualizations (e.g., charts, tables, etc.) for a user of the client device. To obtain the data for the visualizations, the client device queries data from a data model managed by a computing system. Each visualization has a query management component with which it is associated that manages query models representing queries for data for the visualization. The query models associated with different visualizations may use the same object (also referred to as a shared object) that specifies data to be used for the visualizations. Then, the query management component of each visualization generates a query based on its respective query model and sends the query to the computing system. When the visualizations receive the requested data from the computing system, they use the received data to generate the visualizations.

The techniques described in the present application provide a number of benefits and advantages over conventional methods for managing queries. For instance, caching generated blended query models for later reuse reduces the amount of processing resources needed for executing queries on blended query models. Conventional methods may generate query models each time a query is executed.

Figure 1:
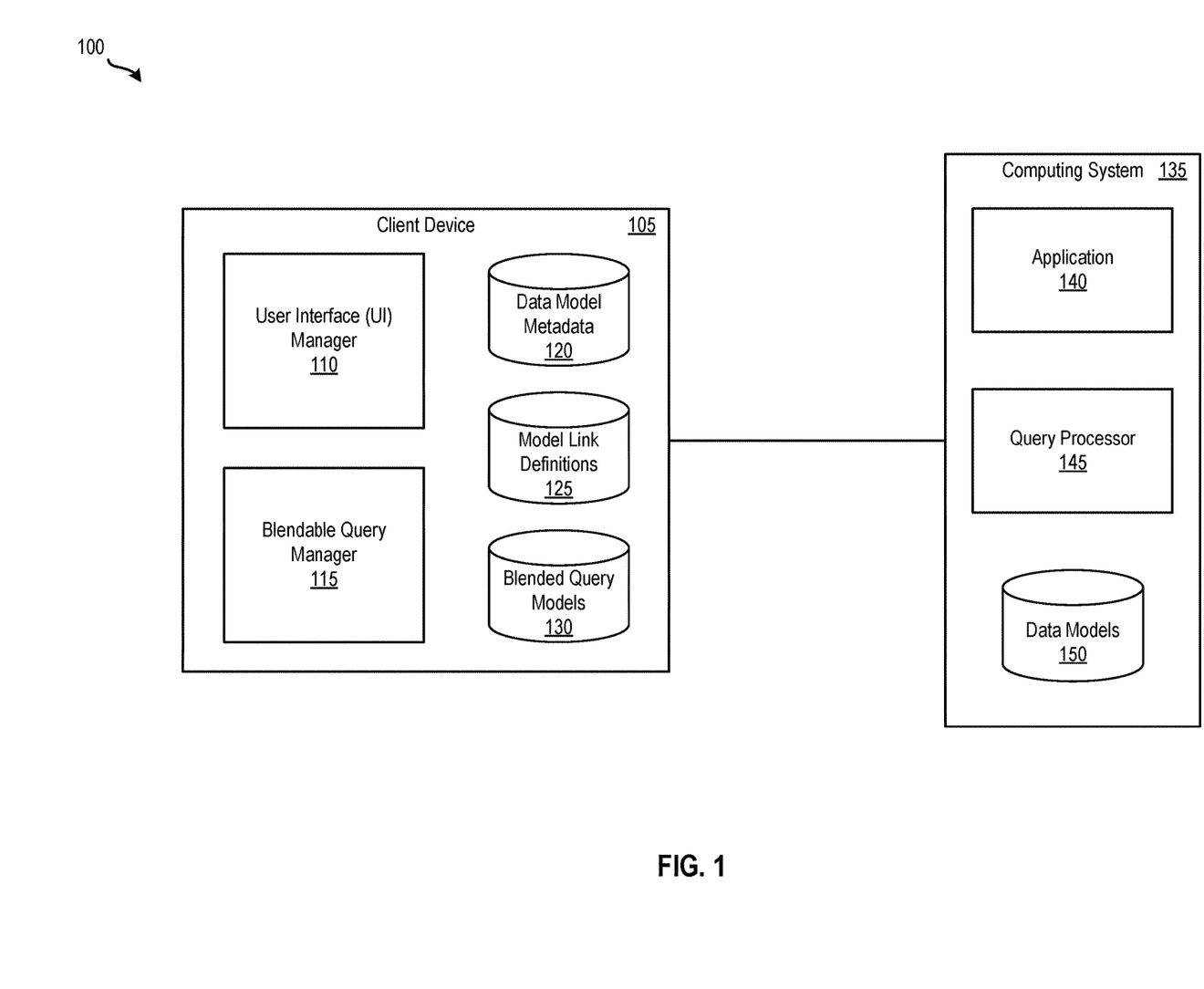
FIG. 1 illustrates a system for managing queries for blended data from data models according to some embodiments.

FIG. 1 illustrates a system 100 for managing queries for blended data from data models according to some embodiments. As shown, system 100 includes client device 105 and computing system 135. FIG. 1 shows client device 105 including user interface (UI) manager 110, blendable query manager 115, and storages 120-130. While FIG. 1 shows one client device, one of ordinary skill in the art will appreciate that system 100 can include any number of additional client devices that are configured the same as or similar to client device 105. Data model metadata storage 120 stored metadata describing data models (e.g., data models stored in data models storage 150, blended data models, etc.). Model link definitions storage 125 is configured to store model link definitions. In some embodiments, a model link definition specifies a first dimension in a first data model and a second dimension in a second data model. Blended queries storage 130 stores blended query models.

UI manager 110 is responsible for providing graphical user interfaces (GUIs) for interacting with client device 105. For example, UI manager 110 can provide a GUI for configuring blended data for visualizations. Through such a GUI, a user of client device 105 may configure blended data for a visualization by selecting data models, selecting attributes (e.g., dimensions, measures, etc.) of data models, selecting dimensions of data models for linking the data models, specifying a data blend configuration (e.g., a join type, an unlinked dimension configuration, etc.), etc. In some embodiments, a data model specifies a set of data that is organized according to a set of measures and a set of dimensions. In some such embodiments, a measure is a field that is configured to store quantitative (e.g., numeric) data whereas a dimension is a field that is configured to store qualitative data. Values stored in a measure can be referred to as measure values and values stored in dimensions can be referred to as dimension values. In some embodiments, a dimension is configured to categorize measures based on the dimension values of the dimension. In addition, a user of client device 105 can, via the GUI, make modifications to a configuration for blending data for a visualization. Upon receiving a modification to a configuration, UI manager 110 forwards the modification to blendable query manager 115.

When UI manager 110 receives a configuration for blending data for a visualization from a user of client device 105, UI manager 110 stores the selected dimensions of the data models for linking the data models as a model link in model link definitions storage 125. Then, UI manager 110 replaces the data model linking information in the configuration with a reference to the model link stored in model link definitions storage 125. UI manager 110 sends the configuration to blendable query manager 115. In some instances, UI manager 110 can receive from a user of client device 105 a request for the blended data for the visualization. In response to the request, UI manager 110 forwards the request to blendable query manager 115 for processing. In return, UI manager 110 receives the requested blended data from blendable query manager 115. Next, UI manager 110 generates the visualization to include the received blended data and provides it for viewing (e.g., on a display of client device 105).

Blendable query manager 115 is configured to manage queries for blended data from data models. For instance, blendable query manager 115 may receive from UI manager 110 a configuration for blending data for a visualization. As mentioned above, a configuration for blending data for a visualization can include selection of data models, selection of attributes (e.g., dimensions, measures, etc.) of data models, selection of dimensions of data models for linking the data models, specification of a data blend configuration, etc. In response to receiving a configuration for blending data for a visualization, blendable query manager 115 sends computing system 135 a request for metadata describing the data models (e.g., the set of measures defined for each of the data models, the set of dimensions defined for each of the data models, etc.). In return, blendable query manager 115 receives from computing system 135 metadata describing the data models. In some embodiments, the metadata received from computing system 135 is in the form of a JavaScript Object Notation (JSON) format. Blendable query manager 115 then stores the metadata in data model metadata storage 120.

In some cases, blendable query manager 115 may receive from UI manager 110 a request for blended data for a visualization. In response to such a request, blendable query manager 115 generates a blend definition based on the configuration for the blended data for the visualization. In some embodiments, blendable query manager 115 generates a blend definition by accessing model link definitions storage 125 and retrieving a model link using the reference in the configuration. In some embodiments, a blend definition defines how data from specified data models are to be blended to form a blended data model. For example, the dimensions specified in the model link may be the attributes on which data from the data models are joined. Blendable query manager 115 then generates a blended query model based on the blend definition. In some embodiments, a query model represents a query state of a data model. In some such embodiments, a blended query model represents a query state of a blended data model. Blendable query manager 115 can generate a blended query model by sending computing system 135 a request for metadata describing a blended data model comprising data blended based on the blend definition. Once blendable query manager 115 receives the metadata from computing system 135, blendable query manager 115 converts the metadata into a blended query model. In some embodiments, the metadata received from computing system 135 is in the form of a JSON format. Next, blendable query manager 115 executes a query for the blended data for the visualization based on the blended query model. In some embodiments, blendable query manager 115 executes the query by generating the query based on the blended data model, sending the query to computing system 135 for processing. In return, blendable query manager 115 receives a result set of the query from computing system 135, which blendable query manager 115 forwards to UI manager 110.

Blendable query manager 115 also handles modifications to configurations (e.g., selecting additional and/or different data models, selecting new dimensions in data models for a model link, selecting new attributes in a data model, modifying a data blend configuration, etc.). For newly selected dimensions in data models for a model link, blendable query manager 115 accesses model link definitions storage 125 and updates the model link referenced by the reference in the configuration with the new dimensions. For other modifications, blendable query manager 115 updates the configuration accordingly.

As depicted in FIG. 1, computing system 135 includes application 140, query processor 145, and data models storage 150. Data models storage 150 stores data models. As mentioned above, in some embodiments, a data model specifies a set of data that is organized according to a set of measures and a set of dimensions. In some embodiments, data models storage 150 is implemented in a single physical storage while, in other embodiments, data models storage 150 may be implemented across several physical storages. While FIG. 1 shows data models storage 150 as part of computing system 135, one of ordinary skill in the art will appreciate that data models storage 150 may be external to computing system 135 in some embodiments.

Application 140 is a software application operating on computing system 135 configured to interact with client device 105. For instance, application 140 may receive a request for metadata associated with a data model from client device 105. In response to the request, application 140 accesses data models storage 150 to determine metadata for a data model (e.g., a set of dimensions defined for the data model, a set of measures defined for the data model, etc.) and sends the metadata to client device 105. As another example, application 140 can receive a query model (e.g., blended query model 470) from client device 105. Upon receiving the query model, application 140 forwards it to query processor 145. Once query processor 145 receiving the requested data from query processor 145, application 140 forwards it to client device 105.

Query processor 145 is responsible for processing queries represented by query models. For example, query processor 145 may receive a query model from application 140. In response, query processor 145 executes the query represented by the query model by accessing data models storage 150 and retrieving the data specified in the query. In cases where the query model includes a calculation object, query processor 145 derives data from data in the specified data model based on the calculation object. In cases where the query model includes a threshold object, query processor 145 flags values based on the set of rules specified in the threshold object. Once query processor 145 finishes executing the query, query processor 145 sends application 140 the retrieved data, generated data, and/or flagged data.

Figure 2:
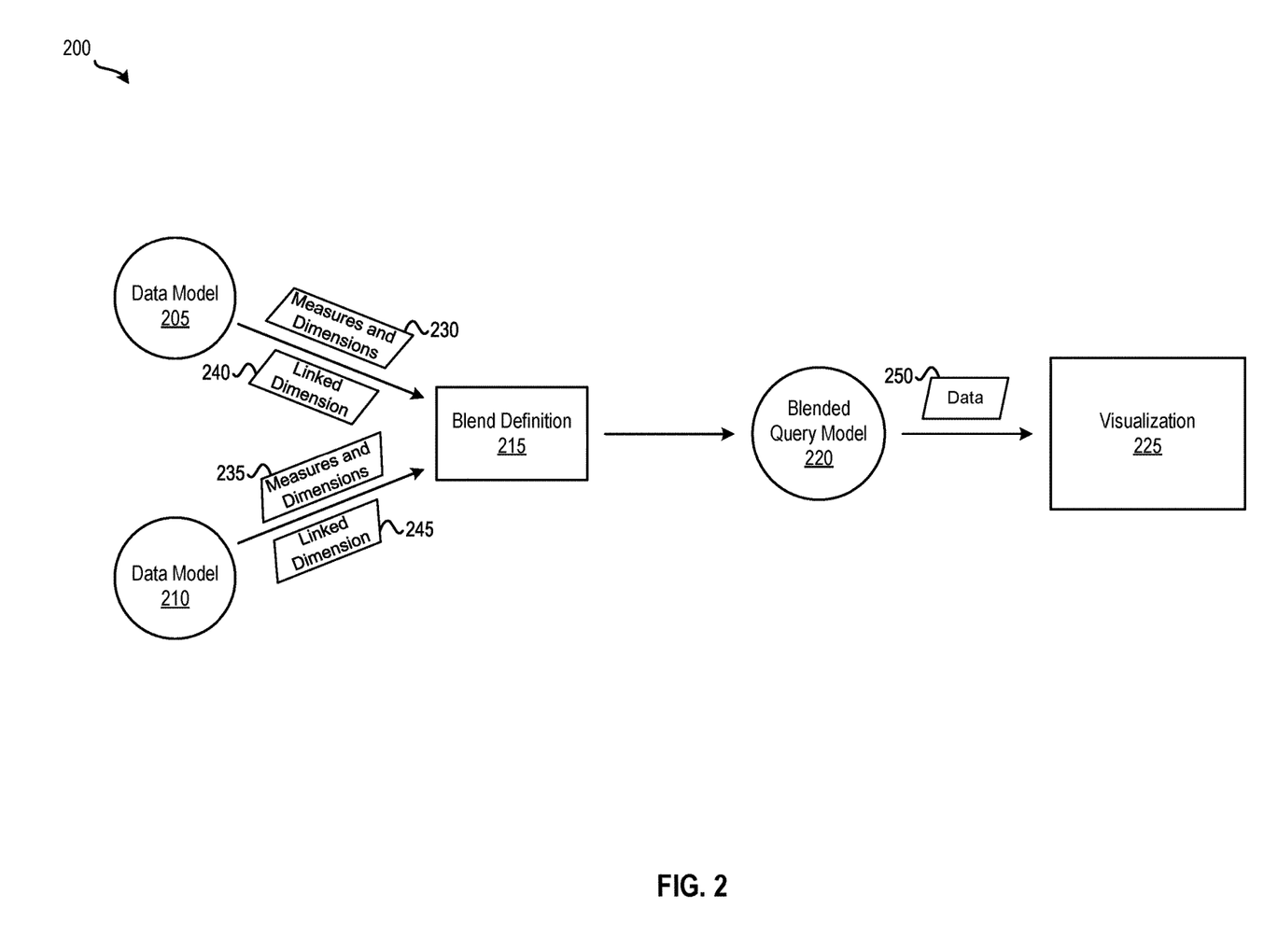
FIG. 2 illustrates an example data flow for providing a visualization with blended data from data models according to some embodiments.

An example data blending operation will now be described by reference to FIGS. 2-4. The example operation demonstrates how data from two data models are blended to form a blended data model, which is then used to query data for a visualization. FIG. 2 illustrates an example data flow 200 for providing a visualization with blended data from data models according to some embodiments. As illustrated, data flow 200 includes data model 205, data model 210, blend definition 215, blended query model 220, and visualization 225. As described above, a data model specifies a set of data that is organized according to a set of measures and a set of dimensions. In this example, data model 205 represents a first set of data organized according to a first set of measures and a first set of dimensions. Data model 210 represents a second set of data organized according to a second set of measures and a second set of dimensions.

For this example, a first subset of the first set of measures and the first set of dimensions in data model 205 are selected. The first subset is depicted in FIG. 2 as measures and dimensions 230. Similarly, a second subset of the second set of measures and the second set of dimensions in data model 210 are selected. The second subset is shown in FIG. 2 as measures and dimensions 235. In this example, a first dimension is select from data model 205 and a second dimension is selected from data model 210. The first and second dimensions, illustrated as linked dimension 240 and linked dimension 245, respectively, form a model link between data model 205 and data model 210. In some embodiments, UI manager 110 can receive, via a GUI provided by UI manager 110, the selections of measures and dimensions 230, measures and dimensions 235, linked dimension 240, and linked dimension 245 from a user of client device 105.

Data flow 200 shows measures and dimensions 230, measures and dimensions 235, linked dimension 240, and linked dimension 245 being provided to blend definition 215. Here, measures and dimensions 230, measures and dimensions 235, linked dimension 240, and linked dimension 245 are used to generate blend definition 215. In some embodiments, blendable query manager 115 may generate blend definition 215. As explained above, a blend definition defines how data from specified data models are to be blended to form a blended data model.

Based on blend definition 215, blended query model 220 is generated. In some embodiments, blendable query manager 115 can generate blended query model 220 by sending computing system 135 a request for metadata describing a blended data model comprising data blended based on blend definition 215. Here, the blended data model includes data blended from data models 205 and 210 according to blend definition 215. In this example, records in data model 205 and records in data model 210 are joined together based on linked dimensions 240 and 245. The records in the blended data model include only measures and dimensions 230 from data model 205 and measures and dimensions 235 from data model 210. Once generated, blendable query manager 115 converts the blended data model into blended query model 220. Based on blended query model 220, blendable query manager 115 queries for data 250 and then provides it to visualization 225. In some embodiments, blendable query manager 115 can query for data 250 from computing system 135.

Figure 3:
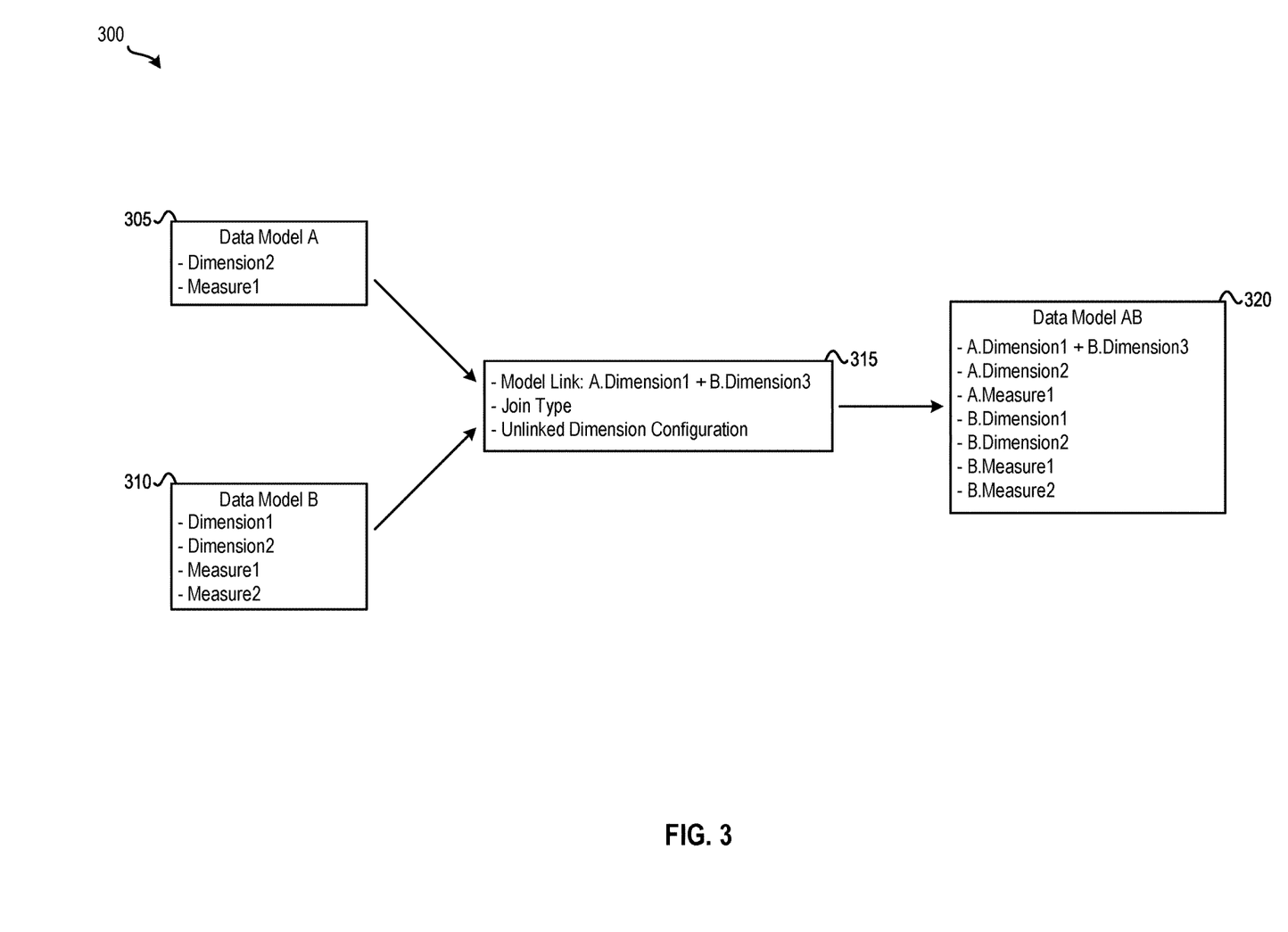
FIG. 3 illustrates an example configuration for blending data from data models according to some embodiments.

FIG. 3 illustrates an example configuration 300 for generating a blended data model according to some embodiments. As shown, configuration 300 includes measures and dimensions 305 and measures and dimensions 310. For this example, measures and dimensions 305 are measures and dimensions selected from a first data model (data model A in this example). Measures and dimension 310 are measure and dimensions selected from a second data model (data model B in this example). In some embodiments, a user of client device 105 can select measures and dimensions 305 and measures and dimensions 310 via a GUI provided by UI manager 110. Measures and dimensions 305 includes two dimensions and one measure: Dimension1, Dimension2, and Measure1. Measures and dimensions 310 includes three dimensions and two measures: Dimension1, Dimension2, Dimension3, Measure1, and Measure2.

As illustrated in FIG. 3, configuration 300 also includes blend definition 315. In this example, blend definition 315 specifies a model link comprised of Dimension1 from data model A (depicted as A.Dimension1) and Dimension3 from data model B (depicted as B.Dimension3). In some embodiments, a user of client device 105 may select, via a GUI provided by UI manager 110, Dimension1 from data model A and Dimension3 from data model B as the model link for configuration 300. Additionally, blend definition 315 specifies a join type and an unlinked dimension configuration. Examples of join type include an intersect join, a primary join, a full outer join, etc. In some embodiments, an unlinked dimension configuration specifies how to handle dimensions that are not part of the join (i.e., dimension selected for the data blending but are not specified for the model link). For instance, an unlinked dimension configuration may specify to create more rows, merge rows together, etc.

For this example, measures and dimensions 305, measure and dimensions 310, and blend definition 315 form configuration 300. Here, blendable query manager 115 uses configuration 300 to generate blended data model 320. For example, blendable query manager 115 may send computing system 135 a request for metadata describing a blended data model comprising data blended based on blend definition 315. After receiving the metadata from computing system 135, blendable query manager 115 can then convert the metadata into blended query model 320. As depicted in FIG. 3, blended query model 320 includes the linked dimensions upon which a join was performed. Specifically, the linked dimensions are Dimension1 from data model A (indicated as A.Dimension1) and Dimension3 from data model B (indicated as B.Dimension3). Blended query model 320 also includes the selected measures and dimension from data model A (indicated as A.Dimension2 and A.Measure1). In addition, blended data model 320 includes the selected measures and dimensions from data model B (indicated as B.Dimension1, B.Dimension2, B.Measure1, and B.Measure2).

Figure 4:
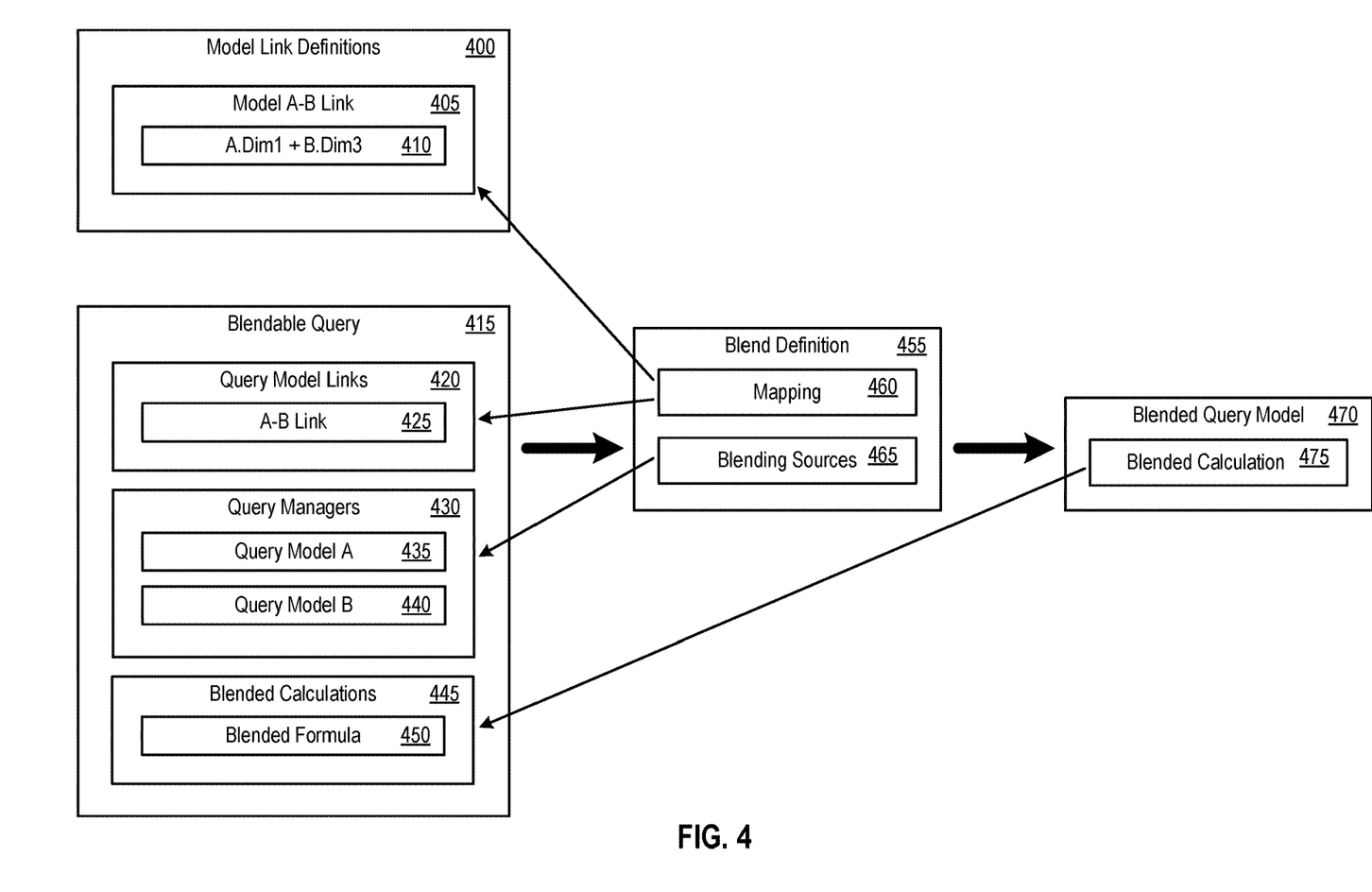
FIG. 4 illustrates an example of executing a query on a blended query model according to some embodiments.

FIG. 4 illustrates an example of executing a query on a blended query model according to some embodiments. In particular, FIG. 4 shows a configuration for blending data from data models that comprises model link definitions 400 and blendable query 415. Model link definitions stores model link definitions. In some embodiments, model link definitions may be implemented by model link definitions storage 125. In this example, model links definitions 400 includes model A-B link 405. As shown, model A-B link 405 specifies set of dimensions 410 that includes Dimension1 from data model A and a Dimension3 from data model B.

As depicted in FIG. 4, blendable query 415 includes query model links 420, query managers 430, and blended calculations 445. Query model links 420 is configured to store references to model links. Here, query model links 420 stores a reference 425, which is a reference to Model A-B link 405. Query managers 430 store query models for the underlying query models used for blending data. As mentioned above, in some embodiments, a query model represents a query state of a data model. As shown, query managers 430 includes query model 435 and query model 440. For this example, query model 435 represents a query state of data model A and query model 440 represents a query state of data model B. Blendable query 415 further includes blended calculations 445. In some embodiments, a blended calculation defines a measure whose values are derived from data (e.g., measures and/or dimensions) in a blended data model. For this example, blended calculations 445 includes blended formula 450 that specifies a formula defining a measure whose values are derived from data in a blended data model. While FIG. 4 shows a configuration that includes blended calculations, one of ordinary skill in the art will appreciate that additional and/or different query objects may be included in configurations for blending data. Examples of query objects include threshold objects, which specify rules associated with a measure in a data model; filter objects, etc.

When blendable query manager 115 receives from UI manager 110 a request for blended data for a visualization based on the configuration illustrated in FIG. 4, blendable query manager 115 generates blend definition 455. As shown, blend definition 455 includes mapping 460 that maps reference 425 to model link 405. Also, blend definition 455 includes blending sources 465. In this example, blending sources 465 include data from data model A, which is represented by query model 435 and data from data model B, which is represented by query model 440.

Once blend definition 455 is generated, blendable query manager 115 then generates blended query model 470. Here, blendable query manager 115 generates blended query model 470 by sending computing system 135 a request for metadata describing a blended data model comprising data blended based on blend definition 455. After receiving the metadata from computing system 135, blendable query manager 115 converts the metadata into blended query model 470. Then, blendable query manager 115 adds blended calculation 475 to blended query model 470 using blended formula 450. Next, blendable query manager 115 executes a query for the requested blended data for the visualization and executes the query. For this example, blendable query manager 115 executes the query by generating the query based on blended data model 470, sending the query to computing system 135 for processing, and receiving from computing system 135 a result set of the query. Blendable query manager 115 forwards the result set of the query to UI manager 110.

In some embodiments, blendable query manager 115 deletes blend definition 455 and blended query model 470 after executing the query. In other embodiments, blendable query manager 115 stores blended query model 470 in blended query models storage 130 for later use. For instance, if blendable query manager 115 receives from UI manager 110 a request for blended data for a visualization based on the same configuration illustrated in FIG. 4, blendable query manager 115 can retrieve the cached blended query model 470 from blended query models storage 130 and use it to execute a query for the requested blended data for the visualization. In some cases, blendable query manager 115 can still reuse blended query model 470 even if changes are made to the configuration. Examples of such changes include adding a filter, adding a sort, adding a measure included in query model 435 or 440, etc. In certain cases, blendable query manager 115 cannot reuse blended query model 470. For instance, modifying model link 405 (e.g., selecting a different dimension for set of dimensions 410), adding a new dimension or measure that is not included in query model 435 or 440, etc. would require blendable query manager 115 to generate a new blend definition and blended query model in order to execute a query for the requested blended data for the visualization.

Figure 5:
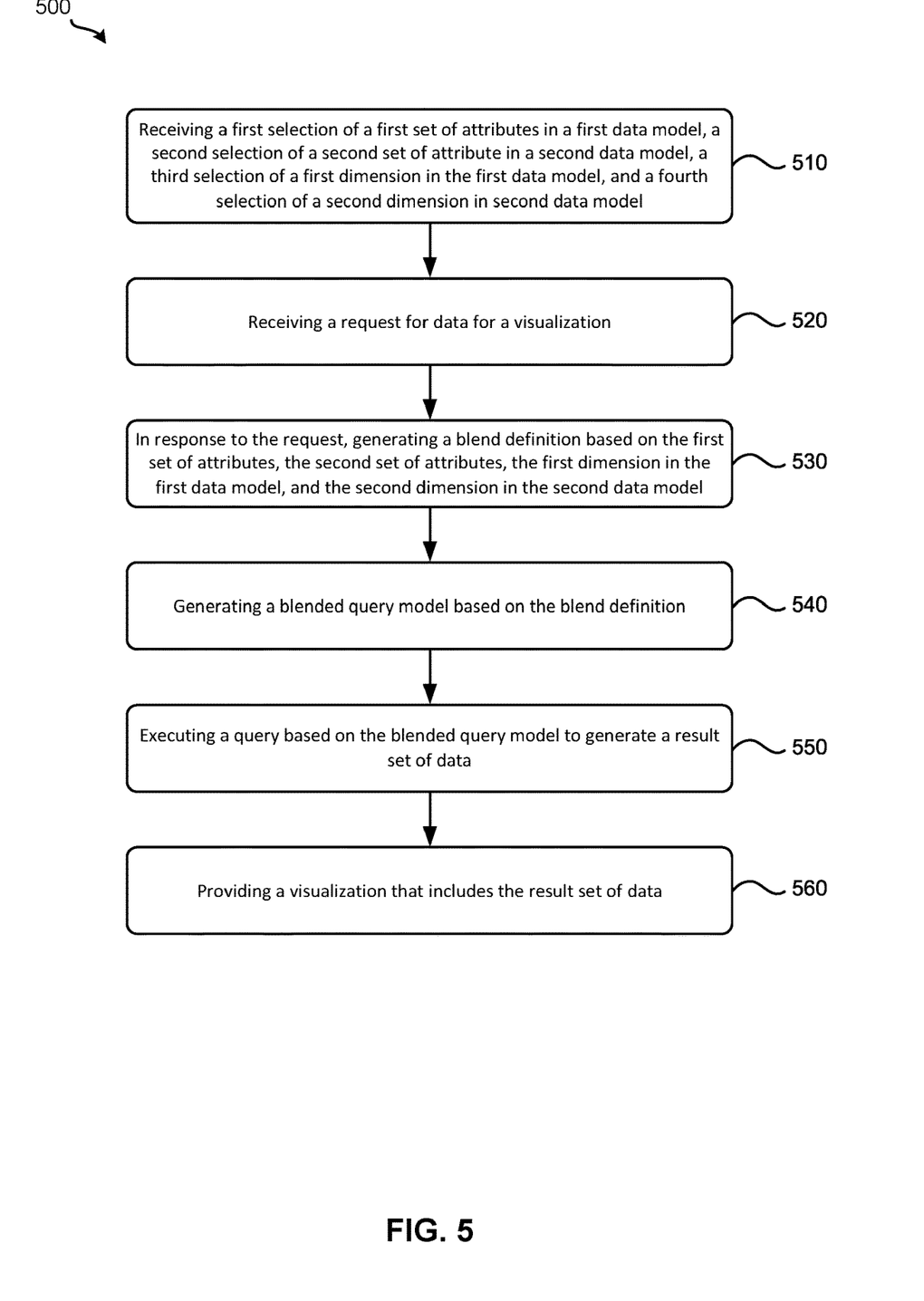
FIG. 5 illustrates a process for managing a query for blended data from data models according to some embodiments.

FIG. 5 illustrates a process 500 for managing a query for blended data from data models according to some embodiments. In some embodiments, client device 105 performs process 500. Process 500 begins by receiving, at 510, a first selection of a first set of attributes in a first data model, a second selection of a second set of attribute in a second data model, a third selection of a first dimension in the first data model, and a fourth selection of a second dimension in second data model. Referring to FIGS. 1 and 2 as an example, UI manager 110 can receive a selection of measures and dimensions 230, measures and dimensions 235, linked dimension 240, and linked dimension 245.

Next, process 500 receives, at 520, a request for data for a visualization. Referring to FIGS. 1 and 2 as an example, blendable query manager 115 may receive a request from UI manager 110 for blended data for visualization 225. In response to the request, process 500 generates, at 530, a blend definition based on the first set of attributes, the second set of attributes, the first dimension in the first data model, and the second dimension in the second data model. Referring to FIGS. 1 and 2 as an example, blendable query manager 115 can generate blend definition 215 based on measures and dimensions 230, measures and dimensions 235, linked dimension 240, and linked dimension 245.

At 540, process 500 generates a blended query model based on the blend definition. Referring to FIGS. 1 and 2 as an example, blendable query manager 115 may generate blended query model 220 by sending computing system 135 a request for metadata describing a blended data model comprising data blended based on blend definition 215. Blendable query manager 115 can convert the blended data model into blended query model 220.

Then, process 500 executes, at 550, a query based on the blended query model to generate a result set of data. Referring to FIGS. 1 and 2 as an example, blendable query manager 115 may query data 250 based on blended query model 220 and then provided to visualization 225. In some embodiments, blendable query manager 115 can query for data 250 from computing system 135. Finally, process 500 provides, at 560, a visualization that includes the result set of data. Referring to FIGS. 1 and 2 as an example, upon receiving the blended data from blendable query manager 115, UI manager 110 generates visualization 225 to include the blended data.

Figure 6:
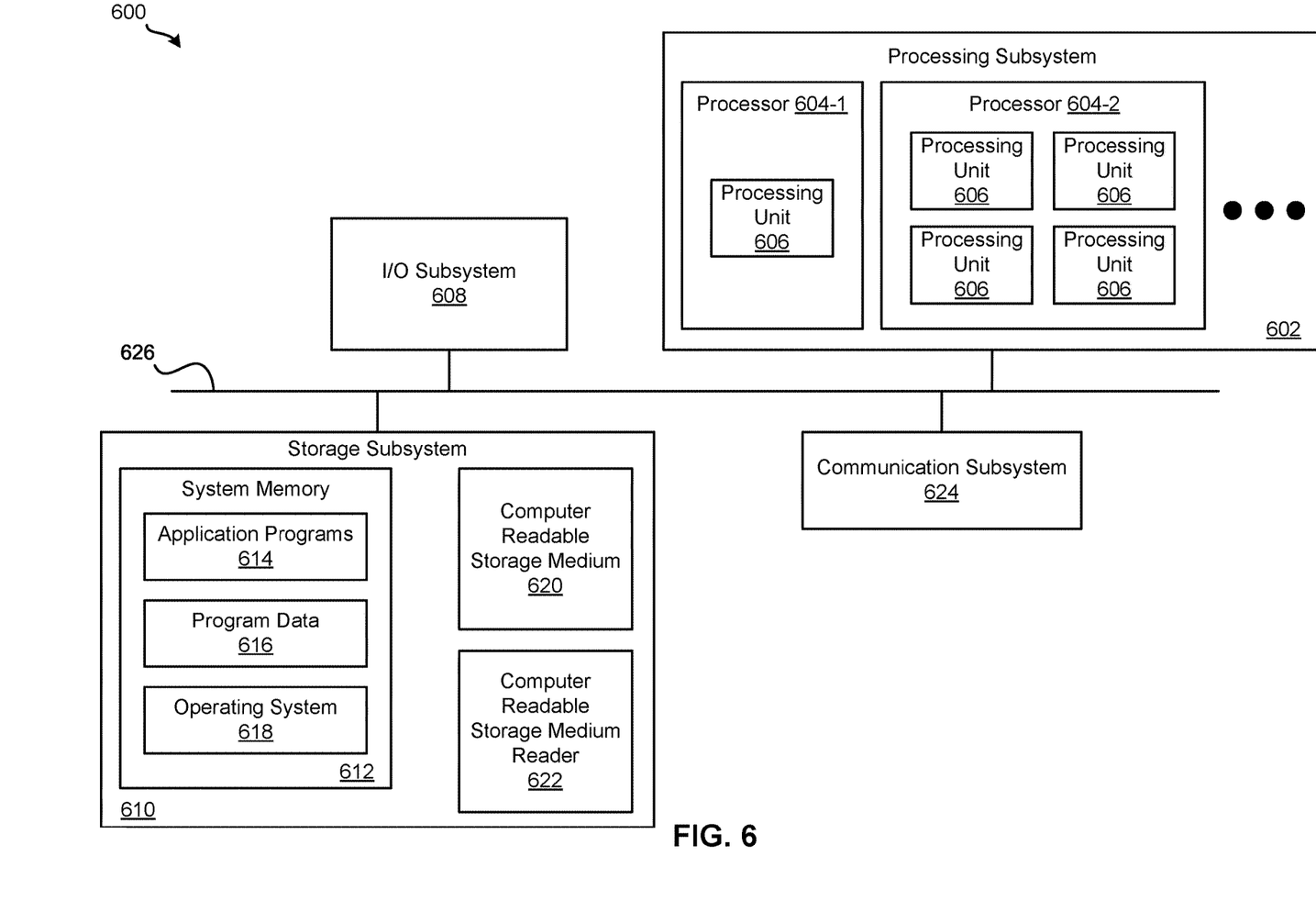
FIG. 6 illustrates an exemplary computer system, in which various embodiments may be implemented.

FIG. 6 illustrates an exemplary computer system 600 for implementing various embodiments described above. For example, computer system 600 may be used to implement client device 105 and computing system 135. Computer system 600 may be a desktop computer, a laptop, a server computer, or any other type of computer system or combination thereof. Some or all elements of UI manager 110, blendable query manager 115, application 140, query processor 145, or combinations thereof can be included or implemented in computer system 600. In addition, computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., application 140), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., UI manager 110, blendable query manager 115, application 140, and query processor 145) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
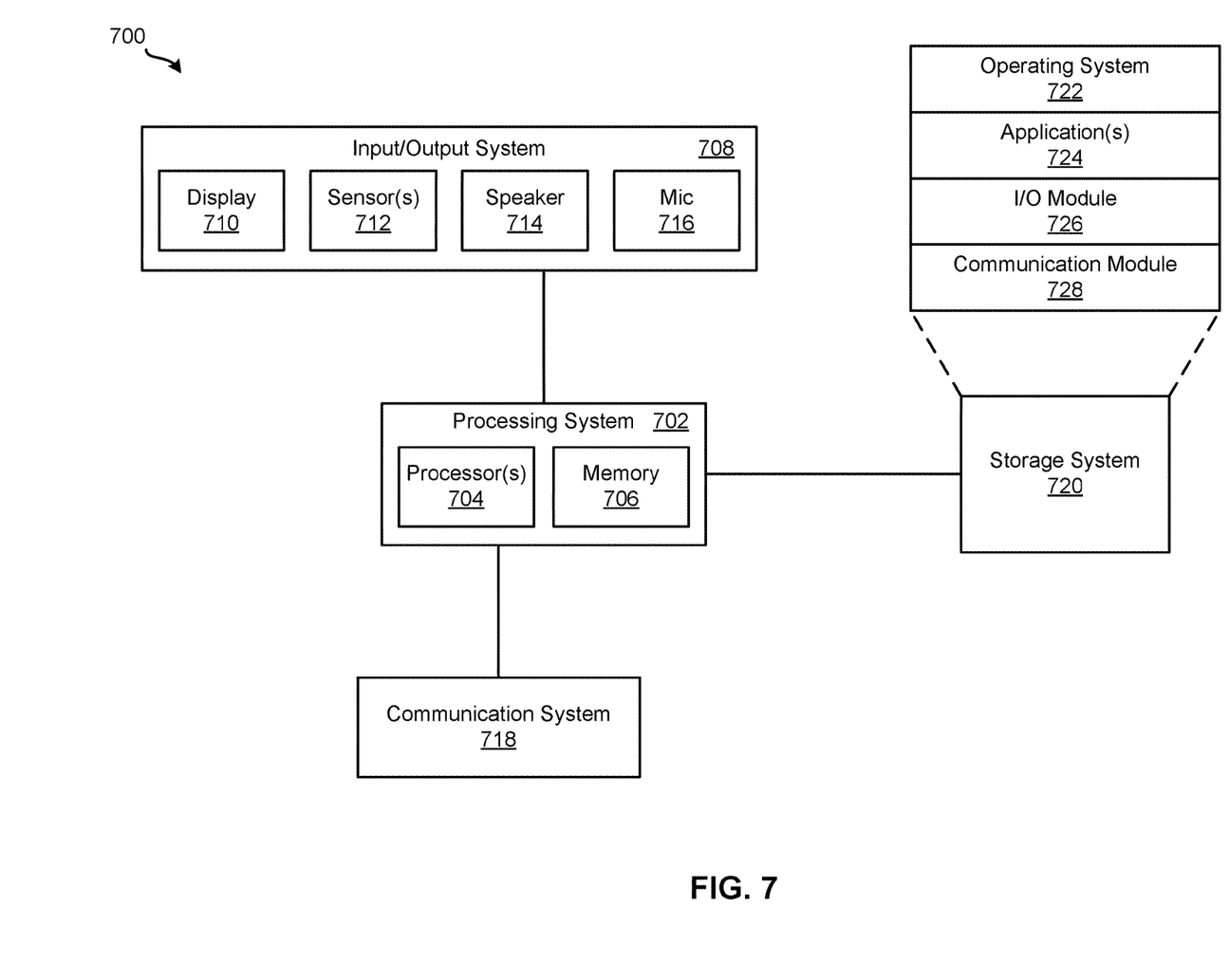
FIG. 7 illustrates an exemplary computing device, in which various embodiments may be implemented.

FIG. 7 illustrates an exemplary computing device 700 for implementing various embodiments described above. For example, computing device 700 may be used to implement client device 105. Computing device 700 may be a cellphone, a smartphone, a wearable device, an activity tracker or manager, a tablet, a personal digital assistant (PDA), a media player, or any other type of mobile computing device or combination thereof. Some or all elements of UI manager, blendable query manager 115, or combinations thereof can be included or implemented in computing device 700. In addition, computing device 700 can implement many of the operations, methods, and/or processes described above (e.g., process 500). As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
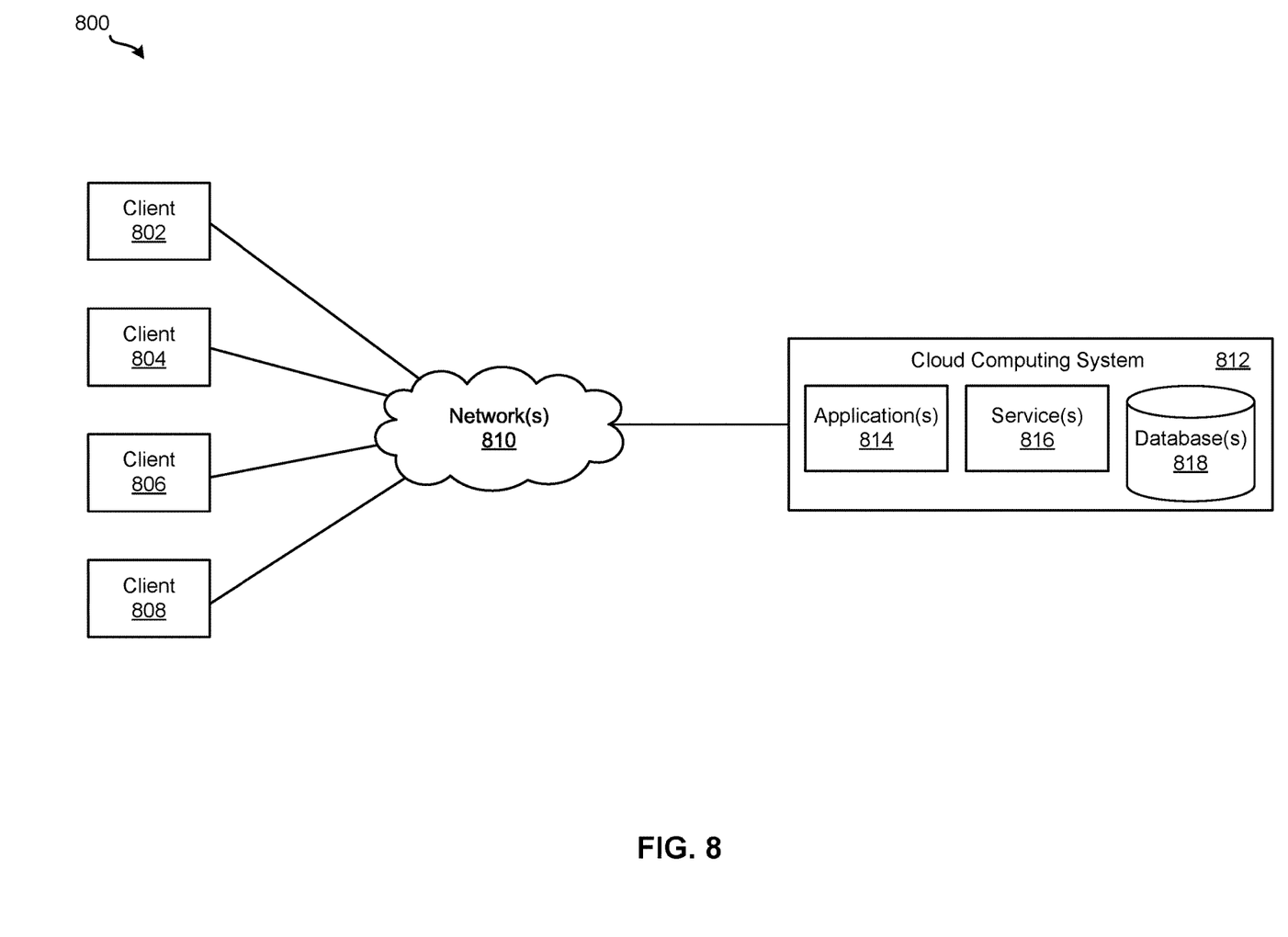
FIG. 8 illustrates an exemplary system, in which various embodiments may be implemented.

FIG. 8 illustrates an exemplary system 800 for implementing various embodiments described above. For example, one of the client devices 802-808 may be used to implement client device 105 and cloud computing system may be used to implement computing system 135. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 812 is referred to as a "cloud service." Typically, servers and systems that make up cloud computing system 812 are different from the on-premises servers and systems of a customer. For example, cloud computing system 812 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, data models storage 150 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-

808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a client device, the program comprising sets of instructions for:
   receiving, by the client device, a blend configuration comprising a first selection of a first set of attributes in a first data model, a second selection of a second set of attributes in a second data model, a third selection of a first dimension in the first data model, and a
      fourth selection of a second dimension in the second data model, wherein the third selection of the first dimension in the first data model and the fourth selection of the second dimension in the second data model form a data model link;
   receiving, by the client device, a request for data for a visualization;
   generating, by the client device, a blend definition based on the first set of attributes, the second set of attributes, the first dimension in the first data model, and the second dimension in the second data model, wherein the blend definition defines how data from the first and second data models are blended to form a blended data model, wherein the generating the blend definition is further based on the blend configuration, wherein the generating the blend definition comprises:
      storing the first dimension in the first data model and the second dimension in the second data model as a model link in a model link definition storage; and
      replacing the data model link in the blend configuration with a reference to the model link stored in the model link definition storage:
   sending the blend configuration to a blend query manager;
   sending, by the client device, to a computing system, a request for metadata describing the blended data model that comprises the data blended based on the blend definition;
   receiving, by the client device, the metadata from the computing system;
   generating, by the client device, a blended query model based on the blend definition and the metadata;
   generating, by the client device, a query based on the blended query model;
   sending, by the client device, the query to the computing system for the computing system to execute the query and generate a result set of data for the query;
   receiving, by the client device, the result set of data from the computing system; and providing, by the client device, a visualization that includes the result set of data.

2. The non-transitory machine-readable medium of claim 1, wherein the program further comprises a set of instructions for, after executing the query, deleting the blend definition and the blended query model.

3. The non-transitory machine-readable medium of claim 1, wherein the result set of data is a first result set of data, wherein the request for data for the visualization is a first request for data for a first visualization, wherein the query is a first query, wherein the program further comprises sets of instructions for: after executing the first query, storing the generated blended query model for later use; receiving a second request for data for a second visualization; in response to the second request, executing a second query based on the blended query model to generate a second result set of data; and
   providing the second visualization that includes the second result set of data.

4. The non-transitory machine-readable medium of claim 1, wherein generating the blended query model comprises: sending a computing system a request for metadata describing a blended data model comprising data blended based on the blend definition; receiving the metadata from the computing system; and converting the metadata into the blended query model.

5. The non-transitory machine-readable medium of claim 4, wherein the first set of attributes in the first data model is included in a first plurality of attributes in the first data model, wherein the second set of attributes in the second data model is included in a second plurality of attribute in the second data model.

6. The non-transitory machine-readable medium of claim 1, wherein executing the query further comprises: generating the visualization that includes the result set of data.

7. A method executable by a client device, the method comprising:
   receiving, by the client device, a blend configuration comprising a first selection of a first set of attributes in a first data model, a second selection of a second set of attributes in a second data model, a third selection of a first dimension in the first data model, and a fourth selection of a second dimension in the second data model, wherein the third selection of the first dimension in the first data model and the fourth selection of the second dimension in the second data model form a data model link;
   receiving, by the client device, a request for data for a visualization;
   generating, by the client device, a blend definition based on the first set of attributes, the second set of attributes, the first dimension in the first data model, and the second dimension in the second data model, wherein the blend definition defines how data from the first and second data models are blended to form a blended data model, wherein the generating the blend definition is further based on the blend configuration, wherein the generating the blend definition comprises:
      storing the first dimension in the first data model and the second dimension in the second data model as a model link in a model link definition storage; and
      replacing the data model link in the blend configuration with a reference to the model link stored in the model link definition storage;
   sending the blend configuration to a blend query manager;

sending, by the client device, to a computing system, a request for metadata describing the blended data model that comprises the data blended based on the blend definition;

receiving, by the client device, the metadata from the computing system;

generating, by the client device, a blended query model based on the blend definition and the metadata;

generating, by the client device, a query based on the blended query model; sending, by the client device, the query to the computing system for the computing system to execute the query and generate a result set of data for the query;

receiving, by the client device, the result set of data from the computing system; and providing, by the client device, a visualization that includes the result set of data.

8. The method of claim 7 further comprising, after executing the query, deleting the blend definition and the blended query model.

9. The method of claim 7, wherein the result set of data is a first result set of data, wherein the request for data for the visualization is a first request for data for a first visualization, wherein the query is a first query, the method further comprising: after executing the first query, storing the generated blended query model for later use; receiving a second request for data for a second visualization; in response to the second request, executing a second query based on the blended query model to generate a second result set of data; and providing the second visualization that includes the second result set of data.

10. The method of claim 7, wherein generating the blended query model comprises: sending a computing system a request for metadata describing a blended data model comprising data blended based on the blend definition; receiving the metadata from the computing system; and converting the metadata into the blended query model.

11. The method of claim 10, wherein the first set of attributes in the first data model is included in a first plurality of attributes in the first data model, wherein the second set of attributes in the second data model is included in a second plurality of attribute in the second data model.

12. The method of claim 7, wherein executing the query further comprises: generating the visualization that includes the result set of data.

13. A client device comprising:
a set of processing units; and
a non-transitory machine-readable medium storing instructions that when executed by at least one processing unit in the set of processing units cause the at least one processing unit to:
receive, by the client device, a blend configuration comprising a first selection of a first set of attributes in a first data model, a second selection of a second set of attributes in a second data model, a third selection of a first dimension in the first data model, and a fourth selection of a second dimension in the second data model, wherein the third selection of the first dimension in the first data model and the fourth selection of the second dimension in the second data model form a data model link;
receive, by the client device, a request for data for a visualization;

generate, by the client device, a blend definition based on the first set of attributes, the second set of attributes, the first dimension in the first data model, and the second dimension in the second data model, wherein the blend definition defines how data from the first and second data models are blended to form a blended data model, wherein the generating the blend definition is further based on the blend configuration, wherein the generating the blend definition comprises:
store the first dimension in the first data model and the second dimension in the second data model as a model link in a model link definition storage; and
replace the data model link in the blend configuration with a reference to the model link stored in the model link definition storage;
send the blend configuration to a blend query manager;
send, by the client device, to a computing system, a request for metadata describing the blended data model that comprises the data blended based on the blend definition; receive, by the client device, the metadata from the computing system; generate, by the client device, a blended query model based on the blend definition and the metadata;
generate, by the client device, a query based on the blended query model; send, by the client device, the query to the computing system for the computing system to execute the query and generate a result set of data for the query; receive, by the client device, the result set of data from the computing system; and provide, by the client device, a visualization that includes the result set of data.

14. The client device of claim 13, wherein the instructions further cause the at least one processing unit to, after executing the query, delete the blend definition and the blended query model.

15. The client device of claim 13, wherein the result set of data is a first result set of data, wherein the request for data for the visualization is a first request for data for a first visualization, wherein the query is a first query, wherein the instructions further cause the at least one processing unit to: after executing the first query, store the generated blended query model for later use; receive a second request for data for a second visualization; in response to the second request, execute a second query based on the blended query model to generate a second result set of data; and provide the second visualization that includes the second result set of data.

16. The client device of claim 13, wherein generating the blended query model comprises: sending a computing system a request for metadata describing a blended data model comprising data blended based on the blend definition; receiving the metadata from the computing system; and converting the metadata into the blended query model.

17. The client device of claim 16, wherein the first set of attributes in the first data model is included in a first plurality of attributes in the first data model, wherein the second set of attributes in the second data model is included in a second plurality of attribute in the second data model.

18. The client device of claim 13, wherein executing the query further comprises: generating the visualization that includes the result set of data.

* * * * *